(12) United States Patent
Gall et al.

(10) Patent No.: US 6,526,527 B1
(45) Date of Patent: Feb. 25, 2003

(54) SINGLE-PROCESSOR SYSTEM

(75) Inventors: Richard Gall, Esslingen (DE); Thomas Maier, Copenhagen (DE); Erwin Schmid, Stuttgart (DE); Jürgen Trost, Grafenberg (DE); Gert Volk, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/416,770

(22) Filed: Oct. 13, 1999

(30) Foreign Application Priority Data

Oct. 17, 1998 (DE) ......................... 198 47 986

(51) Int. Cl.[7] ................................. H02H 3/05
(52) U.S. Cl. ........................... 714/55; 714/51
(58) Field of Search .................. 714/55, 10, 23, 714/51

(56) References Cited

U.S. PATENT DOCUMENTS 4,866,713 A * 9/1989 Worger et al. ............... 714/25
5,113,504 A * 5/1992 Matsuda ....................... 714/23
5,740,360 A * 4/1998 Huckstepp ................... 714/39

FOREIGN PATENT DOCUMENTS

| JP | 5-8649 | 2/1993 |
|---|---|---|
| JP | 5-81080 | 4/1993 |

* cited by examiner

Primary Examiner—Scott Baderman
Assistant Examiner—Yolanda L Wilson
(74) Attorney, Agent, or Firm—Crowell & Moring LLP

(57) ABSTRACT

A single processor system features independent multiple watchdog units allocated to a processor unit of the system, the watchdog units operable to monitor for system faults and, upon detecting a fault, further operative to place the processor system into a predetermined fault reaction state. The multiple watchdog units are each provided with respective different watchdog calls which are output to the processor unit depending upon program execution.

4 Claims, 1 Drawing Sheet

SINGLE-PROCESSOR SYSTEM

Figure 1:
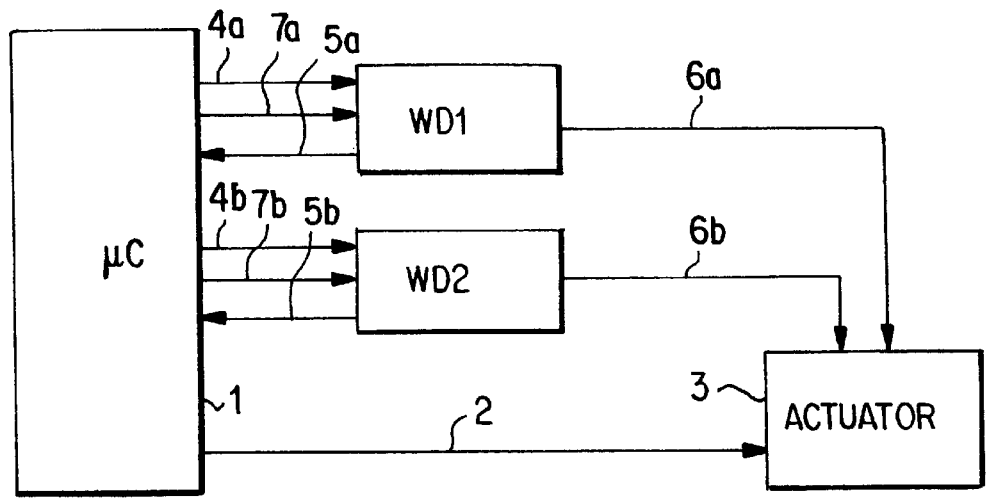

The invention relates to a single-processor system for carrying out a required system function, the system having both a single processor unit carrying out the system function and fault reaction means which monitor the system for system faults occurring and, if a fault is discovered, react by putting the system into a predetermined fault reaction state.

A single-processor system is understood here to mean a system having only one processor unit for carrying out a particular system function, in contrast to multiprocessor systems, such as described in laid-open specifications EP 0 086 601 A2, EP 0 635 784 A1 and DE 35 02 721 A1, in which a plurality of processor units operate in parallel on a particular system task. To carry out further functions, the present single-processor system can, of course, also have further processor units.

In comparison to multiprocessor systems, the use of only one processor unit to carry out a particular system function has the advantage of less implementational complexity, because the former require additional processor units and measures for collision-free parallel operation of the plurality of processor units. One difficulty in single-processor systems, however, is that, in the event of partial or complete failure of the processor unit, the system function is possibly no longer carried out and the system can reach an undefined state. This is particularly undesirable in safety-critical applications, such as during use in motor-vehicle engineering for performing a safety-critical control function.

A known measure for eliminating this difficulty comprises a redundant system design in which at least two parallel processor units form a multiprocessor system which ensures that, even if one processor unit fails, the required system function is carried out by the other, still operable processor unit. This is again associated with a corresponding implementational complexity, however.

Hence, it is also already known practice to monitor a single processor unit using a so-called watchdog unit, which can be designed in hardware or software and monitors the program execution performed by the processor unit for any fault which may occur. This is achieved as a result of predetermined points in the program execution of the processor unit involving the watchdog unit being called, i.e. driven. If this call does not take place correctly, e.g. within a time period counted off by a timer in the watchdog unit, the watchdog unit outputs a reset command to the processor unit and thus puts the latter into a defined initial state. Particularly for safety-critical applications, however, this measure is still not always satisfactory, because, if the watchdog unit fails, for example, the measure is no longer assured and, in addition, in some cases where a fault occurs, it may be desirable not only for the processor unit to be reset but also for at least one further fault reaction measure to be implemented. Thus, if a safety-critical actuator is driven by the processor unit, for example, it may be desirable, when a fault occurs, not only to reset the processor unit to its defined initial state but also to put the actuator into a defined safety state.

The invention is therefore based on the technical problem of providing a single-processor system of the type mentioned in the introduction which contains fault reaction means which can be implemented with relatively little complexity, are able to put the system into a predetermined fault reaction state when a fault is discovered and which operate in a fail-safe manner to a certain extent.

The invention solves this problem by providing a single-processor system having the features of Claim 1. In this system, the fault reaction means allocated to the single processor unit contain at least two mutually independent watchdog units which are allocated to the processor unit to monitor faults and which, if a system fault is discovered, cause the processor system to be put into the predetermined fault reaction state, for example a noncritical safety state.

This system according to the invention avoids the complexity of multiprocessor systems and yet affords a certain level of security against failure, as a result of the two parallel watchdog units, especially with respect to operational failure of one of these watchdog units. In their fundamental principle, the latter can be designed as conventional watchdog units, and additional functional features can be implemented depending on the application. In the present case, the fact that the two watchdog units are independent of one another is intended to mean that one and the same system fault does not cause them both to fail, so that, in this regard, the desired reliability-increasing watchdog redundancy is provided.

A single-processor system developed according to Claim 2 comprises an actuator driven by the processor unit. In this case, the watchdog units are designed such that they put the actuator into a predetermined state when a fault which has occurred is recognized, where said predetermined state can, in the case of an actuator operating in a safety-critical area, be a noncritical safety state, in particular. In addition, provision may be made for the watchdog units to reset the processor unit to its defined initial state when a fault is recognized. In a further refinement of this measure, Claim 3 provides that the watchdog unit which recognizes the fault keeps the actuator in the predetermined state until said watchdog unit obtains enable information from the processor unit, after receipt of which the watchdog unit enables the actuator again for normal operation.

In a single-processor system developed according to Claim 4, the watchdog units are called at one or more defined points in the program execution performed by the processor unit, in which case the respective watchdog call can contain information about which program execution point is initiating it. The watchdog units contain suitable execution checking means which are able to evaluate the calls and thus recognize whether the processor unit is executing the program correctly or whether there is a system fault. An appropriately intelligent design of the watchdog units can, in particular, allow faults to be recognized in which the processor unit is now running only part of the complete program execution cyclically. If this program part and the remaining program part each contain a call for an intelligent watchdog unit of this type, then although the watchdog unit is driven at sufficiently short time intervals, it nevertheless recognizes the fault on account of the missing call from the rest of the program, which is no longer being processed.

Figure 2:
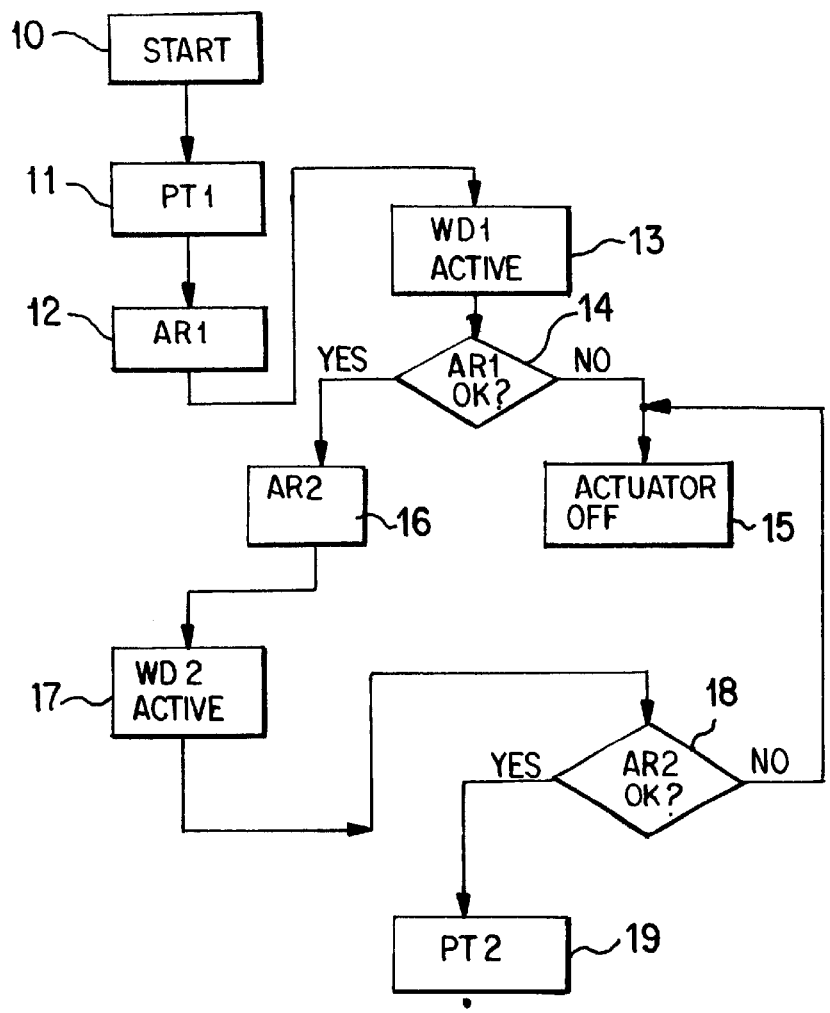

An advantageous embodiment of the invention is shown in the drawings and is described below. In the drawings:

FIG. 1 shows a block diagram of a single-processor system having a driven actuator, and FIG. 2 shows a flow chart of part of a program executed by the processor unit in FIG. 1 to control the actuator.

The single-processor system shown in FIG. 1 contains a microprocessor unit 1 and an actuator 3, which can be driven by the latter via a control line 2, and can be incorporated, for example, in a motor vehicle control device with a safety-critical function. Characteristically, the system also has two parallel watchdog units WD1, WD2. In the example shown, the two watchdog units WD1, WD2 are external physical units, coupled to the processor unit 1, in the form of appropriate watchdog circuits, but alternatively they can be implemented in software, and one or both of the watchdog units WD1, WD2 can also be integrated in the processor unit 1 if need be, as is known per se for conventional watchdog units.

On the one hand, the two watchdog units WD1, WD2 carry out the conventional watchdog function. To do this, they are driven by the processor unit 1 via an associated drive line 4a, 4b whenever this is initiated by an appropriate watchdog call in the program execution performed by the processor unit 1. If such a drive signal from the processor unit 1 fails to appear for longer than a predetermined time period counted off by a timer implemented in the watchdog units WD1, WD2, the relevant watchdog unit WD1, WD2 deduces a system fault and outputs a reset signal via a reset line 5a, 5b, this reset signal resetting the processor unit 1 to a predetermined initial state.

Besides this conventional manner of operation, the two watchdog units WD1, WD2 have further-reaching functional characteristics, to which end they are designed as appropriately intelligent watchdog units. These further-reaching characteristics firstly include the ability for the two watchdog units WD1, WD2 to be able to recognize that point in the program execution performed by the processor unit 1 from which the respective watchdog call originates. For this purpose, the call sent from the processor unit 1 to the respective watchdog unit contains appropriate origin information about the position of the call within the program execution. The watchdog units WD1, WD2 contain execution checking means which are suitable for this and are able to evaluate this origin information and deduce from it whether the system is operating correctly or whether there is a fault. Conventionally, these execution checking means can contain a previously stored table, for example, which lists the identity of the calls for the relevant watchdog unit WD1, WD2 in the sequence of these calls during correct program execution. Alternatively, the execution checking means can comprise a counter and predetermined time values which indicate the maximum time period elapsing between two successive calls for the relevant watchdog unit WD1, WD2 during correct program execution. If the time period counted off by the counter between two successive calls is longer, the watchdog unit WD1, WD2 interprets this as a fault. In this instance, the time values for different successive calls can be chosen to be different if need be, e.g. different for the time period between a first and a second call than for that between the second and a third call within a program cycle.

A further characteristic of the watchdog units WD1, WD2 is their ability not only to reset the processor unit 1 when a fault is recognized but also to put the actuator 3 into the defined state predetermined for this purpose when a system fault occurs; this can, in particular, be a noncritical safety state. For this purpose, an appropriate actuator drive line 6a, 6b runs from each watchdog unit WD1, WD2 to the actuator 3. The watchdog units WD1, WD2 are designed such that, if they recognize that a fault has occurred, they keep the actuator 3 in this defined state until they receive enable information from the processor unit 1 via an enable line 7a, 7b used for this purpose. This processor unit 1 outputs this enable information 7a, 7b as soon as it recognizes that the system is ready for operation again, and the enable information in the watchdog units WD1, WD2 causes them to enable the actuator 3 again, via the relevant drive line 6a, 6b, for normal operation effected by the processor unit 1 via the associated drive line 2.

FIG. 2 illustrates the operation of the watchdog units WD1, WD2 with the aid of an initial part, selected by way of example, of the program execution performed cyclically by the processor unit 1. After the start of a program cycle (step 10), a first program part PT1 is performed first which, amongst other things, contains a release for the actuator 3 (step 11). At the end of this first program part PT1, there is a respective call for each of the two watchdog units WD1, WD2 in succession. A first call AR1 for the first watchdog unit WD1 takes place first, this call AR1, as explained above, containing information about the fact that it is implemented in the program execution at the end of the first program part PT1 and in this way forms the first call for the first watchdog unit WD1 within the program cycle (step 12).

This call AR1 is followed by program monitoring along the lines of the first watchdog unit WD1 (step 13). To this end, said first watchdog unit WD1 checks, as also indicated above, whether the call received is the correct call at the correct instant and is therefore consistent with correct program execution or not (step 14). If not, the actuator 3 is put into the defined state by the first watchdog unit WD1, for example it is switched off (step 15). At the same time, the watchdog unit WD1 resets the processor unit 1. Fault handling can then take place in the processor unit 1. After the fault has been eliminated, the processor unit 1 then sends an enable signal via the enable lines 7a, 7b to the watchdog units WD1, WD2, which then enable actuator operation again.

If, on the other hand, the watchdog monitoring in the first watchdog unit WD1 establishes that the first call AR1 is correct and thus that, to this extent, program execution has been fault-free up to now, that next step to follow in the program execution is the first call AR2 for the second watchdog unit WD2 (step 16). When the second watchdog unit WD2 is activated in this manner (step 17), it performs watchdog monitoring of program execution by checking whether this call AR2 was received in the correct sequence or within the time period provided for it and originates from the correct point in the program execution (step 18). If this is not the case, the second watchdog unit WD2 deduces a system fault, puts the actuator 3 into the defined state provided for this, for example by switching it off, and at the same time causes the processor unit 1 to be reset (step 15), said processor unit 1 then restarting the program cycle again after the fault has been eliminated.

By contrast, if, during its first call AR2 at the end of the first program part PT1, the second watchdog unit WD2 also deduces that program execution has been correct up to now, the processor unit 1 continues program execution by performing a subsequent second program part PT2 (step 19). This procedure is repeated at the end of the program cycle, new calls for the two watchdog units WD1, WD2 being provided at suitable program points in each case.

Expediently, therefore, calls for the two watchdog units WD1, WD2 are provided at crucial points in the program execution such that said watchdog units are, on the one hand, driven sufficiently often so as not to cause any undesirable resetting of the processor unit 1, and, on the other hand, ensure sufficiently precise checking of program execution. The fewer call points there are in the program cycle, the higher the level of fault recognition assurance if the watchdog units WD1, WD2 react only to the time intervals between successive calls without evaluating the call sequence. This is because, the fewer call points there are, the lower the probability that such a call will be within a program part executed cyclically by the processor unit 1 owing to a fault without said processor unit 1 processing the entire program cycle. If, on the other hand, the watchdog units WD1, WD2 are designed such that they can also evaluate the call sequence, then they are easily able to recognize such a fault by the fact that it is always only the call associated with one and the same program point which is received, and no longer all the calls implemented in one program cycle successively.

As made clear by the above description of an advantageous, example, the single-processor system according to the invention can also be used for safety-critical applications in a control device, an electronic architecture or the like, and can cause the system to adopt a state, when a fault occurs, which is previously defined for this purpose. Advantageously, the system requires only a single processor unit. Nevertheless, in the case of an actuator application, even after the processor unit has failed, said actuator can be put into a defined state, in particular switched off, which, according to the invention, is effected by the watchdog unit which recognizes the fault.

What is claimed is:

1. Single-processor system for carrying out a required system function, particularly for performing a safety-critical control function, having a processor unit for carrying out the required system function, and a fault reaction means which monitor the processor system for system faults occurring and have at least two watchdog units which are allocated to the processor unit to monitor faults and which, if a fault is discovered, put the processor system into a predetermined fault reaction state, wherein;

the two watchdog units are provided with different watchdog calls which are output by the processor unit depending on program execution;

wherein said system includes an actuator driven by said processor unit and putting said processor system into a fault reaction involves a first fault recognition by one of said at least two watchdogs units which recognizes said first fault and puts said actuator into a state which is predetermined for said first fault and a second fault recognition by another one of said at least two watchdog units which recognizes the second fault and puts the actuator into said state which is predetermined.

2. Single-processor system according to claim 1, further characterized in that the watchdog unit which recognizes the fault keeps the actuator in the predetermined state until said watchdog unit obtains enable information from the processor unit.

3. Single-processor system according to claim 2, further characterized in that the watchdog calls are implemented at at least one point in the program execution performed by the processor unit, and the watchdog units contain execution checking means which check that a respective watchdog call is received correctly and, in the event of a faulty call, deduce that a system fault has occurred.

4. Single-processor system according to claim 1, further characterized in that the watchdog calls are implemented at at least one point in the program execution performed by the processor unit, and the watchdog units contain execution checking means which check that a respective watchdog call is received correctly and, in the event of a faulty call, deduce that a system fault has occurred.

* * * * *